US009663958B2

United States Patent
Baldwin et al.

(10) Patent No.: US 9,663,958 B2
(45) Date of Patent: May 30, 2017

(54) METHODS OF PRODUCING FOAM STRUCTURES FROM RECYCLED METALLIZED POLYOLEFIN MATERIAL

(71) Applicant: TORAY PLASTICS (AMERICA), INC., N. Kingstown, RI (US)

(72) Inventors: Jesse Baldwin, Strasburg, VA (US); Gary Hostman Clark, Front Royal, VA (US); Pawel Sieradzki, Cross Junction, VA (US)

(73) Assignee: TORAY PLASTICS (AMERICA), INC., N. Kingstown, RI (US)

( * ) Notice: Subject to any disclaimer, the term of this patent is extended or adjusted under 35 U.S.C. 154(b) by 413 days.

(21) Appl. No.: 14/144,986

(22) Filed: Dec. 31, 2013

(65) Prior Publication Data
US 2015/0184400 A1    Jul. 2, 2015

(51) Int. Cl.
| | |
|---|---|
| *E04F 15/18* | (2006.01) |
| *C08J 7/12* | (2006.01) |
| *E04F 15/20* | (2006.01) |
| *C08J 9/00* | (2006.01) |
| *C08J 9/10* | (2006.01) |
| *C08J 3/28* | (2006.01) |

(52) U.S. Cl.
CPC ............ *E04F 15/181* (2013.01); *C08J 3/28* (2013.01); *C08J 7/123* (2013.01); *C08J 9/0061* (2013.01); *C08J 9/103* (2013.01); *E04F 15/206* (2013.01); *C08J 2201/03* (2013.01); *C08J 2203/04* (2013.01); *C08J 2300/30* (2013.01); *C08J 2323/02* (2013.01); *C08J 2400/30* (2013.01); *C08J 2423/02* (2013.01); *Y10T 428/24999* (2015.04); *Y10T 428/249953* (2015.04); *Y10T 428/249987* (2015.04); *Y10T 428/249992* (2015.04)

(58) Field of Classification Search
CPC ......... E04F 15/181; E04F 15/206; C08J 3/28; C08J 7/123; C08J 9/0061; C08J 9/103
See application file for complete search history.

(56) References Cited

U.S. PATENT DOCUMENTS

| | | |
|---|---|---|
| 4,410,602 A | 10/1983 | Komoda et al. |
| 5,118,561 A | 6/1992 | Gusavage et al. |
| (Continued) | | |

FOREIGN PATENT DOCUMENTS

| | | |
|---|---|---|
| EP | 1 066 958 | 1/2001 |
| WO | WO 2011/008845 | 1/2011 |
| (Continued) | | |

OTHER PUBLICATIONS

Baldwin et al., U.S. Office Action mailed May 2, 2016, directed to U.S. Appl. No. 14/144,345; 18 pages.

(Continued)

*Primary Examiner* — Stella Yi
(74) *Attorney, Agent, or Firm* — Morrison & Foerster LLP (57) ABSTRACT

A physically crosslinked, closed cell continuous foam structure derived from recycled metallized polyolefin material; polypropylene, polyethylene, or combinations thereof, a crosslinking agent, and a chemical blowing agent is obtained. The foam structure is obtained by extruding a structure comprising a foam composition, irradiating the extruded structure with ionizing radiation, and continuously foaming the irradiated structure.

17 Claims, 2 Drawing Sheets

(56) References Cited

U.S. PATENT DOCUMENTS

| | | | |
|---|---|---|---|
| 5,462,794 A | 10/1995 | Lindemann et al. |
| 5,552,448 A | 9/1996 | Kobayashi et al. |
| 5,594,038 A | 1/1997 | Kobayashi et al. |
| 5,605,660 A | 2/1997 | Buongiorno et al. |
| 5,646,194 A | 7/1997 | Kobayashi et al. |
| 5,738,922 A | 4/1998 | Kobayashi et al. |
| 5,928,776 A | 7/1999 | Shioya et al. |
| 6,218,023 B1 | 4/2001 | DeNicola, Jr. et al. |
| 6,251,319 B1 | 6/2001 | Tusim et al. |
| 6,537,404 B1 | 3/2003 | Ishiwatari et al. |
| 6,586,482 B2 | 7/2003 | Gehlsen et al. |
| 6,586,489 B2 | 7/2003 | Gehlsen et al. |
| 6,593,380 B2 | 7/2003 | Gehlsen et al. |
| 6,638,985 B2 | 10/2003 | Gehlsen et al. |
| 6,949,283 B2 | 9/2005 | Kollaja et al. |
| 7,083,849 B1 | 8/2006 | Albrecht et al. |
| 7,582,352 B2 | 9/2009 | Kobayashi et al. |
| 7,655,296 B2 | 2/2010 | Haas et al. |
| 7,820,282 B2 | 10/2010 | Haas et al. |
| 7,879,441 B2 | 2/2011 | Gehlsen et al. |
| 2003/0219582 A1 | 11/2003 | Ramesh et al. |
| 2004/0229968 A1 | 11/2004 | Dontula et al. |
| 2006/0276581 A1 | 12/2006 | Ratzsch et al. |
| 2007/0287003 A1 | 12/2007 | Matsumura et al. |
| 2010/0215879 A1 | 8/2010 | Dooley et al. |
| 2010/0286357 A1 | 11/2010 | Matsumura et al. |
| 2011/0244206 A1 | 10/2011 | Penache et al. |
| 2012/0295086 A1 | 11/2012 | Baldwin et al. |
| 2014/0061967 A1* | 3/2014 | Stanhope ............ B29B 17/0042 264/173.19 |
| 2014/0070442 A1 | 3/2014 | Morita et al. |
| 2014/0170344 A1 | 6/2014 | Pramanik et al. |
| 2016/0185080 A1 | 6/2016 | Baldwin et al. |

FOREIGN PATENT DOCUMENTS

| | | |
|---|---|---|
| WO | WO 2013/057737 | 4/2013 |
| WO | WO 2014/049792 | 4/2014 |

OTHER PUBLICATIONS

International Search Report and Written Opinion mailed on May 20, 2016, directed to International Application No. PCT/US2015/67875; 14 pages.

International Search Report and Written Opinion mailed on Mar. 25, 2015, directed to International Application No. PCT/US14/72548; 10 pages.

Baldwin et al., U.S. Office Action mailed Oct. 6, 2016, directed to U.S. Appl. No. 14/586,721; 7 pages.

Baldwin et al., U.S. Office Action mailed Oct. 3, 2016, directed to U.S. Appl. No. 14/586,745; 8 pages.

Baldwin et al., U.S. Office Action mailed Jan. 25, 2017, directed to U.S. Appl. No. 14/144,345; 15 pages.

* cited by examiner

METHODS OF PRODUCING FOAM STRUCTURES FROM RECYCLED METALLIZED POLYOLEFIN MATERIAL

FIELD OF THE INVENTION

This invention relates to foam structures from recycled metallized polyolefin material. More particularly, to cross-linked, closed cell continuous foam structures derived from recycled metallized polyolefin material.

BACKGROUND OF THE INVENTION

Over the past three decades, manufacturing businesses have been successful in recycling many types of wastes: newspapers, cardboard, aluminum, steel, glass, various plastics, etc. In the case of plastics, there are certain types of plastic waste that do not readily recycle into commercially viable new products. One such type of waste is metallized polyolefin material.

Metallized polyolefins are common in the food packaging industry as barrier films. For example, metalized polyolefin films are used as potato chip bags, snack bar wrappers, etc. Other applications of metalized polyolefin films, particularly polypropylene films, include the packaging of electronic and medical devices as well as dielectrics in electronic film capacitors.

Another application of metallized polyolefins, particularly polypropylene, is in the plating industry. Decorative chrome plating (trivalent chromium) of injection molded polypropylene is commonly found on household and domestic appliances as well as on components of other durable and non-durable goods. In addition, also common is decorative vacuum metalizing of polypropylene and polyethylene molded parts and thermoformed sheets, for example, confectionery trays.

Metal plating of polypropylene moldings is also not limited to decorative applications. Engineering requirements such as EMI and RFI shielding, electro-static dissipation, wear resistance, heat resistance, and thermal and chemical barriers at times necessitates the metal plating of polypropylene moldings.

Currently, there are various methods and systems for reclaiming and recycling these metallized polyolefins. Some methods separate the metal from the polyolefin; however, these methods are limited to very thick metal layers. Other methods and systems do not involve separating the metal from the polyolefin. Until now, there have been very few uses for this unseparated metallized polyolefin material. Thus, manufacturers of these metallized polyolefin products regularly send their metal-coated polyolefin waste to landfills instead of recycling them.

Sending any manufacturing waste to a landfill is undesirable. The cost associated with sending waste to a landfill is steadily increasing and there are always environmental concerns with dumping any waste in a landfill.

SUMMARY OF THE INVENTION

Described are foam structures manufactured from recycled metallized polyolefin material and methods of making and using these structures. In some embodiments, these methods and foam structures address the above landfill issues facing manufacturers of metallized polyolefin products. The inventors have found solutions whereby the use of recycled metallized polyolefins in foams: (1) provide a useful outlet for waste metallized polyolefins; (2) reduce manufacturing costs by avoiding landfill expenditures and creating a new market for waste metallized polyolefin material; and (3) lower the carbon footprint for producers of metallized polyolefins. Described are formulations that utilize recycled metallized polyolefin material and incorporates it into physically crosslinked, continuous foam structures with a closed cell morphology.

Some embodiments include methods of forming structures by extruding 5-75 wt. % recycled metallized polyolefin material; 25-95 wt. % polypropylene, polyethylene, or combinations thereof; a crosslinking agent; and a chemical blowing agent in an extruder. The extruder may be a co-rotating, twin screw extruder at a specific energy of at least 0.090 kW·hr/kg, preferably at least 0.105 kW·hr/kg, and more preferably at least 0.120 kW·hr/kg.

The recycled metallized polyolefin material fed into the extruder may be small enough to pass through a standard sieve of about 0.375 inches. Furthermore, the recycled metallized polyolefin material may have had metal layer(s) with an overall thickness of 0.003-100 µm, preferably 0.006-75 µm, and more preferably 0.01-50 µm, prior to being recycled. In addition, the feed to the extruder may contain polypropylene having a melt flow index of 0.1-25 grams per 10 minutes at 230° C. and/or polyethylene having a melt flow index of 0.1-25 grams per 10 minutes at 190° C. The crosslinking agent may be divinylbenzene and the chemical blowing agent may be azodicarbonamide in the extruder feed.

In some embodiments, the extruded structure may be irradiated with ionizing radiation. The extruded structure may be irradiated with ionizing radiation up to 4 separate times, preferably no more than twice, and more preferably only once. The ionizing radiation may be alpha rays, beta rays, gamma rays, or electron beams. Furthermore, the ionizing radiation may be an electron beam with an acceleration voltage of 200-1500 kV, preferably 400-1200 kV, and more preferably 600-1000 kV. The dosage of the electron beam may be 10-500 kGy, preferably 20-300 kGy, and more preferably 20-200 kGy. The ionizing radiation can crosslink the extruded structure to a crosslinking degree of 20-75%, and preferably 30-60%.

In some embodiments, the irradiated structure may also be foamed in a continuous process to form a foam structure. The foaming may include heating the irradiated structure with molten salt, radiant heaters, vertical hot air oven, horizontal hot air oven, microwave energy, or a combination thereof. In addition, the irradiated structure may be preheated prior to foaming. Furthermore, the final structure can have closed cells with an average closed cell size of 0.05-1.0 mm, and preferably 0.1-0.7 mm. The foam structure can have a density of 20-250 kg/m$^3$, and preferably 30-125 kg/m$^3$. In addition, the foam structure can have a thickness of 0.2-50 mm, preferably 0.4-40 mm, more preferably 0.6-30 mm, and even more preferably 0.8-20 mm.

Some embodiments include a foam structure containing 5-75 wt. % recycled metallized polyolefin material; and 25-95 wt. % polypropylene, polyethylene, or combinations thereof. The recycled metallized polyolefin material in the foam structure may have had metal layer(s) with an overall thickness of 0.003-100 µm, preferably 0.006-75 µm, and more preferably 0.01-50 µm, prior to being recycled. In addition, the foam structure may contain polypropylene having a melt flow index of 0.1-25 grams per 10 minutes at 230° C. and/or polyethylene having a melt flow index of 0.1-25 grams per 10 minutes at 190° C.

In some embodiments, the foam structure can have closed cells with an average closed cell size of 0.05-1.0 mm, preferably 0.1-0.7 mm, and the density of the foam structure may be 20-250 kg/m³, preferably 30-125 kg/m³. In addition, the foam structure may have a crosslinking degree of 20-75%, and preferably 30-60%. Furthermore, the foam structure can have a thickness of 0.2-50 mm, preferably 0.4-40 mm, more preferably 0.6-30 mm, and even more preferably 0.8-20 mm.

In addition, in some embodiments the foam structure may be slit, friction sawed, sheared, heat cut, laser cut, plasma cut, water jet cut, die-cut, mechanically cut, or manually cut to form an article.

Some embodiments include a laminate that includes a first layer containing a foam structure containing 5-75 wt. % recycled metallized polyolefin material; and 25-95 wt. % polypropylene, polyethylene or combinations thereof. The embodiment may also include a second layer. The second layer may be a film, fabric, fiber layer, a leather, or combinations thereof. In addition, the second layer may also be a solid hardwood floor panel, an engineered wood floor panel, a laminate floor panel, a vinyl floor tile, a ceramic floor tile, a porcelain floor tile, a stone floor tile, a quartz floor tile, a cement floor tile, a concrete floor tile, or combinations thereof.

The recycled metallized polyolefin material in the first layer may have had metal layer(s) with an overall thickness of 0.003-100 µm, preferably 0.006-75 µm, and more preferably 0.01-50 µm, prior to being recycled. In addition, the first layer may contain polypropylene having a melt flow index of 0.1-25 grams per 10 minutes at 230° C. and/or polyethylene having a melt flow index of 0.1-25 grams per 10 minutes at 190° C.

Some embodiments include a thermoformed article that includes a foam structure. The foam structure may contain 5-75 wt. % recycled metallized polyolefin material; and 25-95 wt. % polypropylene, polyethylene or combinations thereof.

Furthermore, some embodiments include a flooring system containing a top floor layer; a sub-floor layer; and at least one underlayment layer disposed between the sub-floor and top floor layers. The underlayment layer may contain a foam structure. The foam structure may contain 5-75 wt. % recycled metallized polyolefin material; and 25-95 wt. % polypropylene, polyethylene or combinations thereof.

The term "consist essentially of" means that the composition consists almost exclusively of the specified components except that additional unspecified component substances which do not materially affect the basic and novel characteristics of this invention can also be present. For example, the foam structure may include organic peroxides, antioxidants, lubricants, thermal stabilizers, colorants, flame retardants, antistatic agents, and other additives that do not impair inherent performance thereof.

Additional advantages of this invention will become readily apparent to those skilled in the art from the following detailed description. As will be realized, this invention is capable of other and different embodiments, and its details are capable of modifications in various obvious respects, all without departing from this invention. Accordingly, the examples and description are to be regarded as illustrative in nature and not as restrictive.

BRIEF DESCRIPTION OF THE DRAWINGS

Exemplary embodiments of the invention will now be described with reference to the accompanying figures, in which.

DETAILED DESCRIPTION OF THE INVENTION

Described are methods of producing crosslinked, closed cell foam structures derived from recycled metallized polyolefins. The methods for producing a crosslinked, closed cell foam structure from recycled metallized polyolefin material may include the steps of (a) extrusion, (b) irradiation, and (c) foaming. Also described are foam structures manufactured from recycled metallized polyolefin material.

In the extrusion step, a foam composition can be fed into an extruder. The method of feeding ingredients into the extruder is based on the design of the extruder and the material handling equipment available. Preblending ingredients of the foam composition may be performed, if necessary, to facilitate their dispersal. A Henshel mixer is preferably used for such preblending. All ingredients can be preblended and fed thru a single port in the extruder. The ingredients can also be individually fed thru separate designated ports for each ingredient. For example, if the cross-linking agent or any other additive is a liquid, the agent and/or additives can be added through a feeding gate (or gates) on the extruder or through a vent opening on the extruder (if equipped with a vent) instead of being preblended with solid ingredients. Combinations of "preblending" and individual ingredient port feeding can also be employed.

The foam composition fed into the extruder can contain about 5 to about 75 wt. % recycled metallized polyolefin material, preferably from about 10 to about 70 wt. %, and more preferably from about 20 to about 60 wt. %. Recycled metallized polyolefin material is available in various forms. Examples include, but are not limited to: pellets, granules, chips, flakes, beads, cylinders, rods, fluff, and powder. In some embodiments, recycled metallized polyolefin material can be obtained as homogenous pellets utilizing the process disclosed in WO 2013057737 A2, which is hereby incorporated by reference in its entirety. In some embodiments, chips or flakes of recycled metallized polyolefin material can be obtained from plastic chippers and shredders commonly used to reduce the size of waste profiles, injection molded pieces, etc. In a third example, pulverized metallized polyolefin material can be obtained from commercial pulverizing equipment or cryogenic pulverization.

Regardless of the form, it is preferred that the recycled material pieces be reduced in size to pass thru a standard sieve of about 0.375 inches (9.5 mm). Recycled pieces that do not pass thru a standard sieve of about 0.375 inches (9.5 mm) are difficult to sufficiently shear and mix with other ingredients within the extruder. Thus, a homogenous structure may not be obtained. A structure includes, but is not limited to, layers, films, webs, sheets, or other similar structures.

The primary sources of metallized polyolefins are the metalizing and metal coating industries. These industries employ various techniques to obtain metallized polyolefins, including vacuum metallization, arc or flame spraying, electroless plating, or electroless plating followed by electroplating. The coatings are often not limited to one metallic layer. Polyolefin coated with multiple layers of varying metals deposited using different techniques can also be used in the disclosed invention.

Metallized polyolefins can be obtained by vacuum metallization, arc or flame spraying, electroless plating, or electroless plating followed by electroplating. Each technique to obtain metallized polyolefins is briefly described as follows:

In vacuum metallization, a metal is evaporated in a vacuum chamber. The vapor then condenses onto the surface of the substrate, leaving a thin layer of metal coating. This deposition process is also commonly called physical vapor deposition (PVD).

In flame spraying, a hand-held device is used to spray a layer of metallic coating on the substrate. The primary force behind deposition is a combustion flame, driven by oxygen and gas. Metallic powder is heated and melted. The combustion flame accelerates the mixture and releases it as a spray.

Arc spraying is similar to flame spraying, but the power source is different. Instead of depending on a combustion flame, arc spraying derives its energy from an electric arc. Two wires, composed of the metallic coating material and carrying DC electric current, touch together at their tips. The energy that releases, when the two wires touch, heats and melts the wire, while a stream of gas deposits the molten metal onto the surface of the substrate, creating a metal layer.

In electroless plating, the surface of the plastic is etched away using an oxidizing solution. The surface becomes extremely susceptible to hydrogen bonding as a result of the oxidizing solution and typically increases during the coating application. Coating occurs when the polyolefin component (post-etching) is immersed in a solution containing metal ions, which then bond to the plastic surface as a metal layer.

In order for electroplating (electrolytic plating) to be successful, the polyolefin surface must first be rendered conductive, which can be achieved through electroless plating. Once the polyolefin surface is conductive, the substrate is immersed in a solution. In the solution are metallic salts, connected to a positive source of current (cathode). An anodic (negatively charged) conductor is also placed in the bath, which creates an electrical circuit in conjunction with the positively charged salts. The metallic salts are electrically attracted to the substrate, where they create a metal layer. As this process happens, the anodic conductor, typically made of the same type of metal as the metallic salts, dissolves into the solution and replaces the source of metallic salts, which is depleted during deposition.

The amount of coating that can be deposited by each technique varies. Depending on the end use requirements, one technique may be preferable over another. Nonetheless, the metal coatings deposited by these techniques will range from about 0.003 µm for a single layer to 100 µm for a multi-layer coating, preferably from 0.006 µm for a single layer to 75 µm for a multi-layer coating, and more preferably from 0.01 to µm for a single layer to 50 µm for a multi-layer coating. The metal in the recycled metallized polyolefins varies from about 0.05 to about 5 wt. %.

The most common metal coating applied to polyolefins is aluminum. Less common coatings are trivalent chromium, nickel, and copper. Even less common coatings are, but not limited to, tin, hexavalent chromium, gold, silver, as well as co-deposited metals such as nickel-chromium. Those skilled in the art will appreciate that these metal coatings are not necessarily pure elemental coatings. For example, "nickel" may be nickel-phosphorus or nickel-boron alloy and "copper" may be copper-zinc alloy (brass) or copper-tin alloy (bronze). Regardless of whether the metal is or isn't alloyed, the specific metal is still the primary component of the coating. It is preferred that the metallic coating contain 70-100% of the named metal, more preferably 80-100% of the named metal, and even more preferably 85-100% of the named metal. Those skilled in the art will also appreciate that the surface of the metal layers can be oxidized, and some of the metals, tarnished.

Both polypropylene and polyethylene films can be vacuum metalized in the film metallizing industry. It should thus be expected that any recycled metallized polyolefin can contain at least one polypropylene, or at least one polyethylene, or a mixture of both. For barrier applications (rather than decorative applications), both polypropylene and polyethylene films may be coextruded with other barrier layer materials, such as EVOH and PVOH. In such instances, these multilayer films require adhesive "tie layers" to bond the EVOH and PVOH to the polypropylene or polyethylene. These tie layers range in polyolefins from OBC to polyethylene with acetate or ester groups to polyethylene ionomers.

Likewise, polypropylenes and polyethylenes grafted with maleic anhydride are also used in the industry to improve adhesion, not only with adjoining EVOH or PVOH but also with the metal coatings.

In the metal coatings industry, polypropylene may often be preferred over polyethylene. However, due to the broader end use requirements for articles produced in this industry, polypropylenes may be blended with other olefins to meet, for example, softness requirements, impact requirements, or adhesion requirements, etc. Thus, it should be expected that any recycled metallized polyolefin from this industry may be a blended polyolefin.

The polypropylene(s) comprising the polyolefin component of the recycled metallized polyolefin may contain an elastic or softening component, typically an ethylene, α-olefin, or rubber component. Thus, the term "polypropylene" in this disclosure includes, but is not limited to, polypropylene, impact modified polypropylene, polypropylene-ethylene copolymer, metallocene polypropylene, metallocene polypropylene-ethylene copolymer, metallocene polypropylene olefin block copolymer (with a controlled block sequence), polypropylene based polyolefin plastomer, polypropylene based polyolefin elasto-plastomer, polypropylene based polyolefin elastomer, polypropylene based thermoplastic polyolefin blend and polypropylene based thermoplastic elastomeric blend.

A non-limiting example of "polypropylene" is an isotactic homopolypropylene. Commercially available examples include, but are not limited to, FF018F from Braskem and 3271 from Total Petrochemicals.

A non-limiting example of an "impact modified polypropylene" is a homopolypropylene with ethylene-propylene (EP) copolymer rubber. The rubber can be amorphous or semicrystalline but is not in sufficient quantities to render the material any plastomeric or elastomeric properties. A few non-limiting examples of commercially available "impact modified polypropylene" are TI4015F and TI4015F2 from Braskem and Pro-fax® 8623 and Pro-fax® SB786 from LyondellBasell.

"Polypropylene-ethylene copolymer" is polypropylene with random ethylene units. A few non-limiting examples of commercially available "polypropylene-ethylene copolymer" are 6232, 7250FL, and Z9421 from Total Petrochemicals, PP4772 from ExxonMobil, and TR3020F from Braskem.

"Metallocene polypropylene" is metallocene syndiotactic homopolypropylene, metallocene atactic homopolypropylene, and metallocene isotactic homopolypropylene. Non-limiting examples of "metallocene polypropylene" are those commercially available under the trade names METOCENE™ from LyondellBasell and ACHIEVE™ from ExxonMobil. Metallocene polypropylenes are also commercially available from Total Petrochemicals and include, but are not limited to, grades M3551, M3282MZ, M7672, 1251, 1471, 1571, and 1751.

"Metallocene polypropylene-ethylene copolymer" is metallocene syndiotactic, metallocene atactic, and metallocene isotactic polypropylene with random ethylene units. Commercially available examples include, but are not limited to, Lumicene® MR10MX0 and Lumicene® MR60MC2 from Total Petrochemicals and Purell® SM170G from LyondellBasell.

"Metallocene polypropylene olefin block copolymer" is a polypropylene with alternating crystallizable hard "blocks" and amorphous soft "blocks" that are not randomly distributed—that is, with a controlled block sequence. An example of "metallocene polypropylene olefin block copolymer" includes, but is not limited to, the INTUNE™ product line from the Dow Chemical Company.

"Polypropylene based polyolefin plastomer" (POP) and "polypropylene based polyolefin elastoplastomer" are both metallocene and non-metallocene propylene based copolymers with plastomeric and elastoplastomeric properties. Non-limiting examples are those commercially available under the trade name VERSIFY™ (metallocene) from the Dow Chemical Company, VISTAMAXX™ (metallocene) from ExxonMobil, and KOATTRO™ (non-metallocene) from LyondellBasell (a butene-1 based line of plastomeric polymers —certain are butene-1 homopolymer based and others are polypropylene-butene-1 copolymer based materials).

"Polypropylene based polyolefin elastomer" (POE) is both metallocene and non-metallocene propylene based copolymer with elastomeric properties. Non-limiting examples of propylene based polyolefin elastomers are those polymers commercially available under the trade names THERMORUN™ and ZELAS™ (non-metallocene) from Mitsubishi Chemical Corporation, ADFLEX™ and SOFTELL™ (both non-metallocene) from LyondellBasell, VERSIFY™ (metallocene) from the Dow Chemical Company, and VISTAMAXX™ (metallocene) from ExxonMobil.

"Polypropylene based thermoplastic polyolefin blend" (TPO) is polypropylene, polypropylene-ethylene copolymer, metallocene homopolypropylene, and metallocene polypropylene-ethylene copolymer, which have ethylene-propylene copolymer rubber in amounts great enough to give the thermoplastic polyolefin blend (TPO) plastomeric, elastoplastomeric or elastomeric properties. Non-limiting examples of polypropylene based polyolefin blend polymers are those polymer blends commercially available under the trade names EXCELINK™ from JSR Corporation, THERMORUN™ and ZELAS™ from Mitsubishi Chemical Corporation, FERROFLEX™ and RxLOY™ from Ferro Corporation, and TELCAR™ from Teknor Apex Company.

"Polypropylene based thermoplastic elastomer blend" (TPE) is polypropylene, polypropylene-ethylene copolymer, metallocene homopolypropylene, and metallocene polypropylene-ethylene copolymer, which have diblock or multi-block thermoplastic rubber modifiers (SEBS, SEPS, SEEPS, SEP, SERC, CEBC, HSB and the like) in amounts great enough to give the thermoplastic elastomer blend (TPE) plastomeric, elastoplastomeric, or elastomeric properties. Non-limiting examples of polypropylene based thermoplastic elastomer blend polymers are those polymer blends commercially available under the trade name DYNAFLEX® and VERSAFLEX® from GLS Corporation, MONPRENE® and TEKRON® from Teknor Apex Company and DURAGRIP® from Advanced Polymers Alloys (a division of Ferro Corporation).

All of the above polypropylenes may be grafted with maleic anhydride. Non-limiting examples are ADMER® QF500A and ADMER® QF551A for Mitsui Chemicals. It should be noted that most commercial anhydride-grafted polypropylenes also contain rubber.

The term "polyethylene" includes, but is not limited to, LDPE, LLDPE, VLDPE, VLLDPE, HDPE, polyethylene-propylene copolymer, metallocene polyethylene, metallocene ethylene-propylene copolymer, and metallocene polyethylene olefin block copolymer (with a controlled block sequence).

"Metallocene polyethylene" is metallocene based polyethylene with properties ranging from non-elastic to elastomeric. Non-limiting examples of metallocene polyethylene are commercially available under the trade name ENGAGE™ from Dow Chemical Company, ENABLE™ and EXCEED™ from ExxonMobil, and EXACT™ from Borealis.

"VLDPE" and "VLLDPE" are very low density polyethylene and very linear density low density polyethylene containing an elastic or softening component, typically α-olefins. Non-limiting examples of VLDPE and VLLDPE are commercially available under the tradename FLEXOMER™ from the Dow Chemical Company and particular grades of STAMYLEX™ from Borealis.

"Metallocene polyethylene olefin block copolymer" is a polyethylene with alternating crystallizable hard "blocks" and amorphous soft "blocks" that are not randomly distributed—that is, with a controlled block sequence. An example of "metallocene polyethylene olefin block copolymer" includes, but is not limited to, the INFUSE™ product line from the Dow Chemical Company.

All of the above polyethylenes may be grafted with maleic anhydride. Non-limiting commercially available examples are ADMER® NF539A from Mitsui Chemicals, BYNEL® 4104 from DuPont, and OREVAC® 18360 from Arkema. It should be noted that most commercial anhydride-grafted polyethylenes also contain rubber.

These polyethylenes may also be copolymers and terpolymers containing acetate and/or ester groups. The comonomer groups include, but are not limited to, vinyl acetate, methyl acrylate, ethyl acrylate, butyl acrylate, glycidyl methacrylate, and acrylic acid. Non-limiting examples are commercially available under the tradename BYNEL®, ELVAX® and ELVALOY® from DuPont; EVATANE®, LOTADER®, and LOTRYL® from Arkema; ESCORENE™, ESCOR™, and OPTEMA™ from ExxonMobil.

These polyethylenes may also be copolymer and terpolymer ionomers containing acetate and/or ester groups. A common comonomer group is, but is not limited to, methacrylic acid. Non-limiting examples are commercially available under the tradename SURLYN® from DuPont; IOTEK™ from ExxonMobil, and AMPLIFY™ IO from Dow Chemical Company.

The polymer component of the recycled metallized polyolefin may also contain EVOH and/or PVOH ("PVA") ."EVOH" is a copolymer of ethylene and vinyl alcohol. Non-limiting examples are commercially available under the tradename EVAL™ and EXCEVAL™ from Kuraray and SOARNOL™ from Nippon Gohsei. "PVOH" is a polyvinyl alcohol. Non-limiting examples are commercially available under the tradename ELVANOL® from DuPont and POVAL®, MOWIOL®, and MOWIFLEX® from Kuraray.

The foam composition fed into the extruder also can contain about 25 to about 95 wt. %, preferably about 30 to about 90 wt. %, and more preferably about 40 to about 80 wt. %, of at least one polypropylene having a melt flow index from about 0.1 to about 25 grams per 10 minutes at 230° C. and/or at least one polyethylene having a melt flow index from about 0.1 to about 25 grams per 10 minutes at 190° C. In some embodiments, the melt flow index of the polypropylene(s) and/or polyethylene(s) is preferably from about 0.3 to about 20 grams per 10 minutes at 230° C. and at 190° C., respectively, and more preferably from about 0.5 to about 15 grams per 10 minutes at 230° C. and at 190° C., respectively.

The "melt flow index" (MFI) value for a polymer is defined and measured according to ASTM D1238 at 230° C. for polypropylenes and polypropylene based materials and at 190° C. for polyethylenes and polyethylene based materials using a 2.16 kg plunger for 10 minutes. The test time may be reduced for relatively high melt flow resins.

The MFI provides a measure of flow characteristics of a polymer and is an indication of the molecular weight and processability of a polymer material. If the MFI values are too high, which corresponds to a low viscosity, extrusion according to the present disclosure cannot be satisfactorily carried out. Problems associated with MFI values that are too high include low pressures during extrusion, problems setting the thickness profile, uneven cooling profile due to low melt viscosity, poor melt strength and/or machine problems. Problems with MFI values that are too low include high pressures during melt processing, sheet quality and profile problems, and higher extrusion temperatures which cause a risk of foaming agent decomposition and activation.

The above MFI ranges are also important for foaming processes because they reflect the viscosity of the material and the viscosity has an effect on the foaming. Without being bound by any theory, it is believed there are several reasons why particular MFI values are far more effective. A lower MFI material may improve some physical properties as the molecular chain length is greater, creating more energy needed for chains to flow when a stress is applied. Also, the longer the molecular chain (MW), the more crystal entities the chain can crystallize thus providing more strength through intermolecular ties. However, at too low an MFI, the viscosity becomes too high. On the other hand, polymers with higher MFI values have shorter chains. Therefore, in a given volume of a material with higher MFI values, there are more chain ends on a microscopic level relative to polymers having a lower MFI, which can rotate and create free volume due to the space needed for such rotation (e. g., rotation occurring above the $T_g$, or glass transition temperature of the polymer). This increases the free volume and enables an easy flow under stress forces.

These polypropylene(s) and/or polyethylene(s) with specific MFI values include the same types described earlier That is, the polypropylene includes, but is not limited to, polypropylene, impact modified polypropylene, polypropylene-ethylene copolymer, metallocene polypropylene, metallocene polypropylene-ethylene copolymer, metallocene polypropylene olefin block copolymer (with a controlled block sequence), polypropylene based polyolefin plastomer, polypropylene based polyolefin elasto-plastomer, polypropylene based polyolefin elastomer, polypropylene based thermoplastic polyolefin blend and polypropylene based thermoplastic elastomeric blend. Furthermore, the polypropylenes may be grafted with maleic anhydride. In addition, the polyethylene includes, but is not limited to, LDPE, LLDPE, VLDPE, VLLDPE, HDPE, polyethylene-propylene copolymer, metallocene polyethylene, metallocene ethylene-propylene copolymer, and metallocene polyethylene olefin block copolymer (with a controlled block sequence), any of which may contain grafted compatibilizers or copolymers that contain acetate and/or ester groups. As discussed previously, these polyethylenes may be grafted with maleic anhydride. These polyethylenes may also be copolymers and terpolymers containing acetate and/or ester groups and may be copolymer and terpolymer ionomers containing acetate and/or ester groups.

Since a broad range of articles and laminates can be created with the disclosed foam composition, a broad range of polypropylenes and polyethylenes can be employed in the foam composition to meet the various end use requirements of the structures, articles, and laminates.

When relatively large or thick pieces of metal (in relation to the foam cell size) are present in the foam structure, undesirable "voids" and "large cells" may occur. Thus, including polypropylene and/or polyethylene with grafted compatibilizers or copolymers that contain acetate and/or ester groups as ingredients may be required to prevent the formation of these undesirable "voids" and "large cells".

In addition, the foam composition fed into the extruder may also contain further additives compatible with producing the disclosed foam structure. Common additives include, but are not limited to, organic peroxides, antioxidants, lubricants, thermal stabilizers, colorants, flame retardants, antistatic agents, nucleating agents, plasticizers, antimicrobials, antifungals, light stabilizers, UV absorbents, antiblocking agents, fillers, deodorizers, thickeners, cell size stabilizers, metal deactivators, and combinations thereof.

Regardless of how all the ingredients are fed into the extruder, the shearing force and mixing within the extruder must be sufficient to produce a homogenous structure. A co-rotating twin screw extruder can provide sufficient shearing force and mixing thru the extruder barrel to extrude a structure with uniform properties.

Specific energy is an indicator of how much work is being applied during the extrusion of the ingredients and how intensive the extrusion process is. Specific energy is defined as the energy applied to a material being processed by the extruder, normalized to a per kilogram basis. The specific energy is quantified in units of kilowatts of applied energy per total material fed in kilograms per hour. Specific energy is calculated according to the formula:

$$\text{Specific Energy} = \frac{KW(\text{applied})}{\text{feedrate}\left(\frac{\text{kg}}{\text{hr}}\right)}, \text{ where}$$

$$KW(\text{applied}) = \\ \frac{KW(\text{motor rating}) * (\% \text{ torque from maximum allowable}) * RPM(\text{actual running } RPM)}{\text{Max } RPM(\text{capability of extruder}) * 0.97(\text{gearbox efficiency})}$$

Specific energy is used to quantify the amount of shearing and mixing of the ingredients within the extruder. The extruders used for the present invention are capable of producing a specific energy of at least 0.090 kW·hr/kg, preferably at least 0.105 kW·hr/kg, and more preferably at least 0.120 kW·hr/kg.

The extrusion temperature of the structure is preferably at least 10° C. below the thermal decomposition initiation temperature of the chemical blowing agent. If the extrusion temperature exceeds the thermal decomposition temperature of the blowing agent, then the blowing agent will decompose, resulting in undesirable "prefoaming."

The foam composition can include a variety of different chemical blowing agents. Examples of chemical blowing agents include, but are not limited to, azo compounds, hydrazine compounds, carbazides, tetrazoles, nitroso compounds, and carbonates. In addition, a chemical blowing agent may be employed alone or in any combination.

One chemical blowing agent that can be used in some embodiments is azodicarbonamide (ADCA). ADCA's thermal decomposition typically occurs at temperatures between about 190 to 230° C. In order to prevent ADCA from thermally decomposing in the extruder, extruding temperature is maintained at or below 190° C.

If the difference between the decomposition temperature of the thermally decomposable blowing agent and the melting point of the polymer with the highest melting point is high, then a catalyst for blowing agent decomposition may be used. Exemplary catalysts include, but are not limited to, zinc oxide, magnesium oxide, calcium stearate, glycerin, and urea.

The lower temperature limit for extrusion is that of the polymer with the highest melting point. If the extrusion temperature drops below the melting temperature of the polymer with the highest melting point, then undesirable "unmelts" appear in the structure. Upon foaming, an extruded structure that was extruded below this lower temperature limit will exhibit uneven thickness, a non-uniform cell structure, pockets of cell collapse, and other undesirable attributes.

The thickness of the extruded structure is about 0.1 to about 30 mm, preferably from about 0.2 to about 25 mm, more preferably from about 0.3 to about 20 mm, and even more preferably from about 0.4 to about 15 mm.

After the structure has been produced by the extruder, the extruded structure can be subjected to irradiation with ionizing radiation at a given exposure to crosslink the composition of the extruded structure, thereby obtaining an irradiated, crosslinked structure. Ionizing radiation is often unable to produce a sufficient degree of crosslinking on polypropylene(s), polypropylene based materials, some polyethylene(s), and some polyethylene based materials. Thus, a crosslinking agent is typically added to the foam composition that is fed into the extruder to promote crosslinking.

Examples of ionizing radiation include, but are not limited to, alpha rays, beta rays, gamma rays, and electron beams. Among them, an electron beam having uniform energy is preferably used to prepare the crosslinked structures. Exposure time, frequency of irradiation, and acceleration voltage upon irradiation with an electron beam can vary widely depending on the intended crosslinking degree and the thickness of the extruded structure. However, the ionizing radiation should generally be in the range of from about 10 to about 500 kGy, preferably from about 20 to about 300 kGy, and more preferably from about 20 to about 200 kGy. If the exposure is too low, then cell stability is not maintained upon foaming. If the exposure is too high, the moldability of the resulting foam structure may be poor. (Moldability is a desirable property when the foam structure is used in thermoforming applications.) Also, the structure may be softened by exothermic heat release upon exposure to the electron beam radiation such that the structure can deform when the exposure is too high. In addition, the polymer components may also be degraded from excessive polymer chain scission.

The extruded structure may be irradiated up to 4 separate times, preferably no more than twice, and more preferably only once. If the irradiation frequency is more than about 4 times, the polymer components may suffer degradation so that upon foaming, for example, uniform cells will not be created in the resulting foam.

When the thickness of the extruded structure is greater than about 4 mm, irradiating each primary surface of the profile with an ionized radiation is preferred to make the degree of crosslinking of the primary surface(s) and the inner layer more uniform.

Irradiation with an electron beam provides an advantage in that extruded structures having various thicknesses can be effectively crosslinked by controlling the acceleration voltage of the electrons. The acceleration voltage is generally in the range of from about 200 to about 1500 kV, preferably from about 400 to about 1200 kV, and more preferably about 600 to about 1000 kV. If the acceleration voltage is less than about 200 kV, then the radiation cannot reach the inner portion of the extruded structure. As a result, the cells in the inner portion can be coarse and uneven on foaming. Additionally, acceleration voltage that is too low for a given thickness profile will cause arcing, resulting in "pinholes" or "tunnels" in the foamed structure. On the other hand, if the acceleration voltage is greater than about 1500 kV, then the polymers may degrade.

Regardless of the type of ionizing radiation selected, crosslinking is performed so that the composition of the extruded structure is crosslinked about 20 to about 75%, preferably about 30 to about 60%, as measured by the "Toray Gel Fraction Method."

According to the "Toray Gel Fraction Method," tetralin solvent is used to dissolve non-crosslinked components in a composition. In principle, the non-crosslinked material is dissolved in tetralin and the crosslinking degree is expressed as the weight percentage of crosslinked material in the entire composition.

The apparatus used to determine the percent of polymer crosslinking includes: 100 mesh (0.0045 inch wire diameter); Type 304 stainless steel bags; numbered wires and clips; a Miyamoto thermostatic oil bath apparatus; an analytical balance; a fume hood; a gas burner; a high temperature oven; an anti-static gun; and three 3.5 liter wide mouth stainless steel containers with lids. Reagents and materials used include tetralin high molecular weight solvent, acetone, and silicone oil. Specifically, an empty wire mesh bag is weighed and the weight recorded. For each sample, about 100 milligrams ±about 5 milligrams of sample is weighed out and transferred to the wire mesh bag. The weight of the wire mesh bag and the sample, typically in the form of foam cuttings, is recorded. Each bag is attached to the corresponding number wire and clips. When the solvent temperature reaches 130° C., the bundle (bag and sample) is immersed in the solvent. The samples are shaken up and down about 5 or 6 times to loosen any air bubbles and fully wet the samples. The samples are attached to an agitator and agitated for three (3) hours so that the solvent can dissolve the foam. The samples are then cooled in a fume hood. The samples are washed by shaking up and down about 7 or 8 times in a container of primary acetone. The samples are washed a second time in a second acetone wash. The washed samples are washed once more in a third container of fresh acetone as above. The samples are then hung in a fume hood to evaporate the acetone for about 1 to about 5 minutes. The samples are then dried in a drying oven for about 1 hour at 120° C. The samples are cooled for a minimum of about 15 minutes. The wire mesh bag is weighed on an analytical balance and the weight is recorded.

Crosslinking is then calculated using the formula 100*(C−A)/(B−A), where A=empty wire mesh bag weight; B=wire bag weight+foam sample before immersion in tetralin; and C=wire bag weight+dissolved sample after immersion in tetralin.

Suitable crosslinking agents include, but are not limited to, commercially available difunctional, trifunctional, tetrafunctional, pentafunctional, and higher functionality monomers. Such crosslinking monomers are available in liquid, solid, pellet, and powder forms. Examples include, but are not limited to, acrylates or methacrylates such as 1,6-hexanediol diacrylate, 1,6-hexanediol dimethacrylate, ethylene glycol diacrylate, ethylene glycol dimethacrylate, trimethylol propane trimethacrylate, tetramethylol methane triacrylate, 1,9-nonanediol dimethacrylate and 1,10-decanediol dimethacrylate; allyl esters of carboxylic acid (such as trimellitic acid triallyl ester, pyromellitic acid triallyl ester, and oxalic acid diallyl ester); allyl esters of cyanulic acid or isocyanulic acid such as triallyl cyanurate and triallyl isocyanurate; maleimide compounds such as N-phenyl maleimide and N,N'-m-phenylene bismaleimide; compounds having at least two tribonds such as phthalic acid dipropagyl and maleic acid dipropagyl; and divinylbenzene. Additionally, such crosslinking agents may be used alone or in any combination. Divinylbenzene (DVB), a difunctional liquid crosslinking monomer, can be used as a crosslinking agent in the present invention and added to the extruder at a level no greater than 4% PPHR.

Crosslinks may be generated using a variety of different techniques and can be formed both intermolecularly, between different polymer molecules, and intramolecularly, between portions of a single polymer molecule. Such techniques include, but are not limited to, providing crosslinking agents which are separate from a polymer chain and providing polymer chains which incorporate a crosslinking agent containing a functional group which can form a crosslink or be activated to form a crosslink.

After irradiating the extruded structure, foaming may be accomplished by heating the crosslinked structure to a temperature higher than the decomposition temperature of the thermally decomposable blowing agent. For the thermally decomposable blowing agent azodicarbonamide, the foaming is performed at about 200 to about 260° C., preferably about 220 to about 240° C., in a continuous process. A continuous foaming process is preferred over a batch process for production of a continuous foam sheet.

The foaming is typically conducted by heating the crosslinked structure with molten salt, radiant heaters, vertical hot air oven, horizontal hot air oven, microwave energy, or a combination of these methods. The foaming may also be conducted in an impregnation process using, for example, nitrogen in an autoclave, followed by a free foaming via molten salt, radiant heaters, vertical hot air oven, horizontal hot air oven, microwave energy, or a combination of these methods. A preferred combination of molten salt and radiant heaters is used to heat the crosslinked structure.

Optionally, before foaming, the crosslinked structure can be softened with preheating. This helps stabilize the expansion of the structure upon foaming.

The density of the foam structure is defined and measured using section or "overall" density, rather than a "core" density, as measured by JIS K6767. The foam structure produced using the above described method will yield foams with a section, or "overall" density of about 20 to about 250 kg/m$^3$, preferably about 30 kg/m$^3$ to about 125 kg/m$^3$. The section density can be controlled by the amount of blowing agent and the thickness of the extruded structure. If the density of the structure is less than about 20 kg/m$^3$, then the structure does not foam efficiently due to a large amount of chemical blowing agent needed to attain the density. Additionally, if the density of the structure is less than about 20 kg/m$^3$, then the expansion of the structure during the foaming step becomes increasingly difficult to control. Furthermore, if the density of the foam structure is less than 20 kg/m$^3$, then the foam structure becomes increasingly prone to cell collapse. Thus, it is difficult to produce a foam structure of uniform section density and thickness from recycled metallized polyolefin material at a density less than about 20 kg/m$^3$.

The foam structure is not limited to a section density of about 250 kg/m$^3$. A foam of about 350 kg/m$^3$, about 450 kg/m$^3$, or about 550 kg/m$^3$ may also be produced. However, it is preferred that the foam structure have a density of less than about 250 kg/m$^3$ since greater densities are generally cost prohibitive when compared to other materials which can be used in a given application.

The foam structure produced using the above method may have closed cells. Preferably, at least 90% of the cells have undamaged cell walls, preferably at least 95%, and more preferably more than 98%. The average cell size is from about 0.05 to about 1.0 mm, and preferably from about 0.1 to about 0.7 mm. If the average cell size is lower than about 0.05 mm, then the density of the foam structure is typically greater than 250 kg/m$^3$. If the average cell size is larger than 1 mm, the foam will have an uneven surface. There is also a possibility of the foam structure being undesirably torn if the population of cells in the foam does not have the preferred average cell size. This can occur when the foam structure is stretched or portions of it are subjected to a secondary process. The cell size in the foam structure may have a bimodal distribution representing a population of cells in the core of the foam structure which are relatively round and a population of cells in the skin near the surfaces of the foam structure which are relatively flat, thin, and/or oblong.

The thickness of the foam structure is about 0.2 mm to about 50 mm, preferably from about 0.4 mm to about 40 mm, more preferably from about 0.6 mm to about 30 mm, and even more preferably from about 0.8 mm to about 20 mm. If the thickness is less than about 0.2 mm, then foaming is not efficient due to significant gas loss from the primary surfaces. If the thickness is greater than about 50 mm, expansion during the foaming step becomes increasingly difficult to control. Thus, it is increasingly more difficult to produce a foam structure comprising recycled metallized polyolefin material with uniform section density and thickness.

The desired thickness can also be obtained by a secondary process such as slicing, skiving, or bonding. Slicing, skiving, or bonding can produce a thickness range of about 0.1 mm to about 100 mm.

The disclosed foam structures can be used in a variety of applications. One application is foam tapes and gasketing.

Closed cell foam tape is commonly used in areas such as window glazing, where strips of foam tape are placed between two window panes to seal the air between the glass. This improves the thermal insulation property of the window. The foam also acts as a cushion for the glass panes from the effects of thermal expansion and contraction of the building and window frame from daily and seasonal temperature changes. Likewise, closed cell foam gaskets are commonly used for sealing and cushioning. Handheld electronic devices and household appliances are two examples that may contain foam gaskets. A soft, flexible foam structure is usually suited as a tape or gasket.

When the foam structure is to be used as a tape or gasket, a pressure sensitive adhesive layer may be disposed on at least a portion of one or both major surfaces. Any pressure sensitive adhesive known in the art may be used. Examples of such pressure sensitive adhesives include, but are not limited to, acrylic polymers, polyurethanes, thermoplastic elastomers, block copolymers, polyolefins, silicones, rubber based adhesives, copolymers of ethylhexylacrylate and acrylic acid, copolymers of isooctyl acrylate and acrylic acid, blends of acrylic adhesives and rubber based adhesives as well as combinations of the foregoing.

The foam structure can also be thermoformed. To thermoform a layer of the foam structure, the foam must be heated to the melting point of the polyolefin blend. If the blend has immiscible polymers, the blend may exhibit more than one melting point. In this case, the foam structure can typically be thermoformed when the foam is heated to a temperature midway between the foam composition's lowest melting point and highest melting point.

One example of a thermoformed article is an automobile air duct. A closed cell foam structure is particularly suited for this application due to its lower weight (when compared to solid plastic), its insulating properties that help maintain the temperature of the air flowing thru the duct, and its resistance to vibration (versus solid plastic). A firm foam structure is suited for an automobile air duct.

In some embodiments, the foam structures are laminates containing a first layer of the foam composition and a second layer. In these laminates, the foam composition or structure containing layer can, for example, be combined with a film and/or foil. Examples of suitable materials for such layers include, but are not limited to, polyvinyl chloride (PVC); thermoplastic polyolefin (TPO); thermoplastic urethane (TPU); fabrics such as polyester, polypropylene, cloth and other fabrics; leather and/or fiber layers such as non-wovens. Such layers may be manufactured using standard techniques that are well known to those of ordinary skill in the art. Importantly, the foam of the disclosure may be laminated on one or both sides with these materials and may include multiple layers.

In these laminates, a layer may be joined to an adjacent layer by means of chemical bonds, mechanical means and/or combinations of these. Adjacent laminate layers may also be affixed to each other by any other means including the use of attractive forces between materials having opposite electromagnetic charges or attractive forces present between materials which both have either a predominantly hydrophobic character or a predominantly hydrophilic character.

In some embodiments, the foam structures or laminates are used in automobile interior parts such as door panels, door rolls, door inserts, door stuffers, trunk stuffers, armrests, center consoles, seat cushions, seat backs, headrests, seat back panels, instrument panels, knee bolsters, or a headliner. These foam structures or laminates can also be used in furniture (e.g., commercial, office, and residential furniture) such as chair cushions, chair backs, sofa cushions, sofa trims, recliner cushions, recliner trims, couch cushions, couch trim, sleeper cushions, or sleeper trims. These foam laminates or structures can also be used in walls such as modular walls, moveable walls, wall panels, modular panels, office system panels, room dividers, or portable partitions. The foam laminates or structures can also be used in storage casing (e.g., commercial, office and residential) which is either mobile or stationary. Furthermore, the foam laminates and structures can also be used in coverings such as chair cushion coverings, chair back coverings, armrest coverings, sofa coverings, sofa cushion coverings, recliner cushion coverings, recliner coverings, couch cushion coverings, couch coverings, sleeper cushion coverings, sleeper coverings, wall coverings, and architectural coverings.

Some embodiments include a first layer of the disclosed foam structure and a second layer selected from the group consisting of a solid hardwood floor panel, an engineered wood floor panel, a laminate floor panel, a vinyl floor tile, a ceramic floor tile, a porcelain floor tile, a stone floor tile, a quartz floor tile, a cement floor tile, and a concrete floor tile.

In these laminates, the first layer may be joined to the adjacent panel or tile by means of chemical bonds, mechanical means and/or combinations of these. The adjacent laminate layers may also be affixed to each other by any other means including the use of attractive forces between materials having opposite electromagnetic charges or attractive forces present between materials which both have either a predominantly hydrophobic character or a predominantly hydrophilic character.

A popular method of attaching the disclosed foam to a floor panel—particularly a solid hardwood floor panel, an engineered wood floor panel, and a laminate floor panel—is via a pressure sensitive adhesive layer that is disposed on at least a portion of the foam surface and/or panel surface. Any pressure sensitive adhesive known in the art may be used. Examples of such pressure sensitive adhesives are acrylic polymers, polyurethanes, thermoplastic elastomers, block copolymers, polyolefins, silicones, rubber based adhesives, copolymers of ethylhexylacrylate and acrylic acid, copolymers of isooctyl acrylate and acrylic acid, blends of acrylic adhesives and rubber based adhesives as well as combinations of the foregoing.

The foam layer attached to the floor panel—particularly a solid hardwood floor panel, an engineered wood floor panel, and a laminate floor panel—serves several purposes. The foam can reduce the reflected sound pressure level when the panel is impacted, for example, when walking on the panel with boots or high heeled shoes. The foam can also act as a moisture vapor barrier between the panel and sub-floor and can help provide a more uniform laydown among multiple panels since any unevenness, bumps, or spikes (for example a protruding nailhead) on the sub-floor will be buffered by the foam. These floor panels and tiles are commonly installed in residential homes, office buildings, and other commercial buildings.

Another embodiment of the present invention provides a flooring system including: a top floor layer; a sub-floor layer; and one or more underlayment layers where at least one of the underlayment layers contains the disclosed foam structure disposed between the sub-floor and the top floor layer.

In this system, the foam layer may or may not be joined to any adjacent layer, including the sub-floor or the top floor layer. When any layer in the disclosed system is joined, the attachment is performed by means of chemical bonds, mechanical means and/or combinations of these. The adjacent layers may also be affixed to each other by any other means including the use of attractive forces between materials having opposite electromagnetic charges or attractive forces present between materials which both have either a predominantly hydrophobic character or a predominantly hydrophilic character.

If any layers are attached, a popular method of attachment is the use of either a one component urethane adhesive, a two component urethane adhesive, a one component acrylic adhesive, or a two component acrylic adhesive. The adhesive is typically applied during the installation of the system in residential homes, office buildings, and commercial buildings.

The foam layer in this system serves several purposes. The foam can reduce the reflected sound pressure level when the top floor layer is impacted, for example, when walking on the panel with boots or high heeled shoes. The foam can also act as a moisture vapor barrier between the panel and sub-floor and help provide a more uniform laydown among multiple panels since any unevenness, bumps, or spikes (for example a protruding nailhead) on the sub-floor will be buffered by the foam. For cases where the top floor layer is composed of ceramic floor tiles, porcelain floor tiles, stone floor tiles, quartz floor tiles, cement floor tiles, and concrete floor tiles connected by grout and where all layers in the flooring system are joined, the foam can help reduce grout fracturing by buffering varying thermal expansions and contractions of the various layers in the system.

To satisfy the requirements of any of the above applications, the disclosed structures of the present disclosure may be subjected to various secondary processes, including and not limited to, embossing, corona or plasma treatment, surface roughening, surface smoothing, perforation or microperforation, splicing, slicing, skiving, layering, bonding, and hole punching.

EXAMPLES

Example 1

A commercial pulverized LLDPE having an MFI of 6.8 g/10 min (190° C., 2.16 kg), a commercial reactor flake polypropylene-ethylene copolymer having an MFI of 1.5 g/10 min (230° C., 2.16 kg), a masterbatch containing zinc oxide, a masterbatch containing a standard polyolefin antioxidant package, and divinylbenzene were mixed together and fed into a co-rotating twin screw extruder. Simultaneously, tubes of compounded recycled aluminum metalized polypropylene film, azodicarbonamide, and standard polyolefin extrusion processing aid were fed thru other ports on the extruder. The tubes of recycled metalized polypropylene were cylinders of about 3 mm×2.5 mm OD×0.8 mm wall thickness and extrusion compounded from shredded film coated with about 0.02-0.05 μm of aluminum. The three resins were fed into a co-rotating twin screw extruder at 60% LLDPE, 20% polypropylene-ethylene copolymer, and 20% recycled aluminum metalized polypropylene film.

Figure 1A:
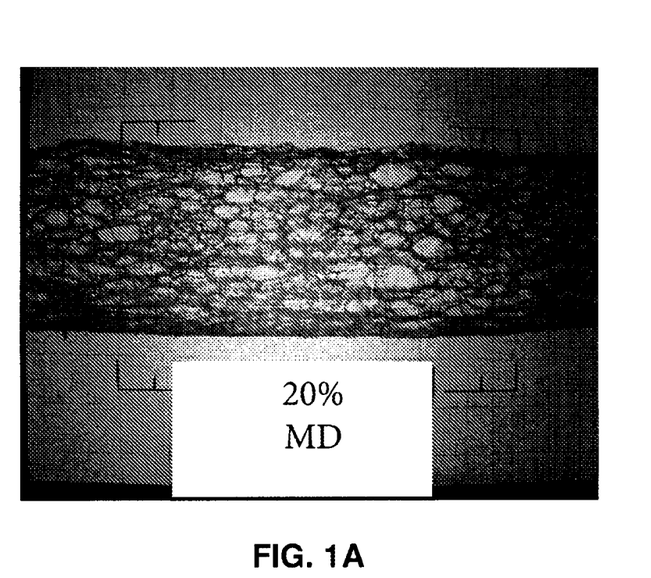
FIG. 1A is a cross sectional photo of the foam structure of Example 1 in the machine direction.
Figure 1B:
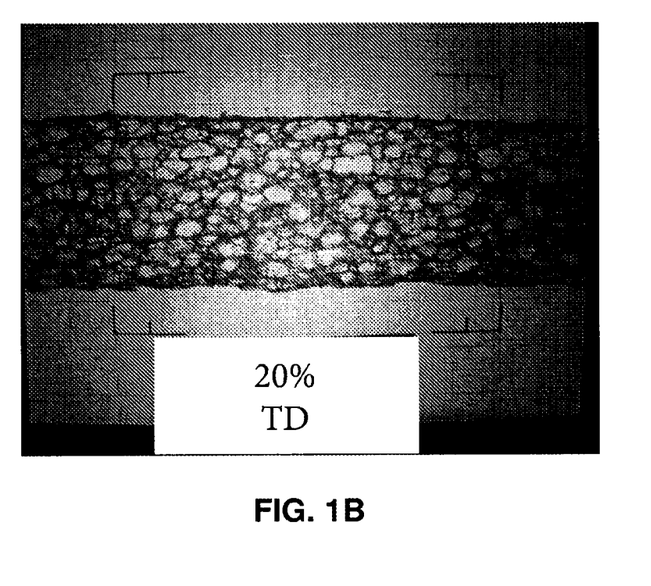
FIG. 1B is a cross sectional photo of the foam structure of Example 1 in the cross-machine direction.

After extrusion at a specific energy of 0.105 kW·hr/kg and at a temperature of 170° C., the sheet was crosslinked by electron beam radiation at a dosage of 57 kGy and then foamed continuously around 241° C. The content of azodicarbonamide and the thickness of the extruded sheet was such that a foam structure of 40 kg/m³ density, 2.0 mm thickness, and 38% crosslinking was obtained. FIG. 1A is a cross section photo of the foam structure of Example 1 in the machine direction and FIG. 1B is a cross section photo of the foam structure of Example 1 in the cross-machine direction.

Example 2

A commercial pulverized LLDPE having an MFI of 6.8 g/10 min (190° C., 2.16 kg), a commercial reactor flake polypropylene-ethylene copolymer having an MFI of 1.5 g/10 min (230° C., 2.16 kg), a masterbatch containing zinc oxide, a masterbatch containing a standard polyolefin antioxidant package, and divinylbenzene were mixed together and fed into a co-rotating twin screw extruder. Simultaneously, tubes of compounded recycled aluminum metalized polypropylene film, azodicarbonamide, and standard polyolefin extrusion processing aid were fed thru other ports on the extruder. The tubes of recycled metalized polypropylene were cylinders of about 3 mm×2.5 mm OD×0.9 mm wall thickness and extrusion compounded from shredded film coated with about 0.02-0.05 μm of aluminum. The three resins were fed into a co-rotating twin screw extruder at 55% LLDPE, 5% polypropylene-ethylene copolymer, and 40% recycled aluminum metalized polypropylene film.

Figure 2A:
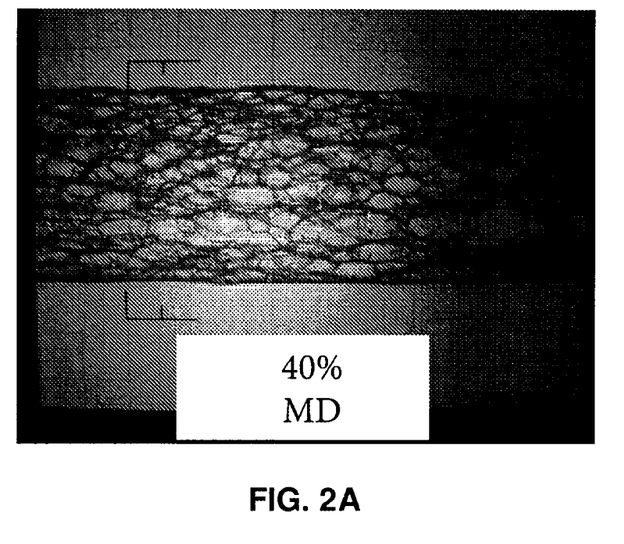
FIG. 2A is a cross sectional photo of the foam structure of Example 2 in the machine direction.
Figure 2B:
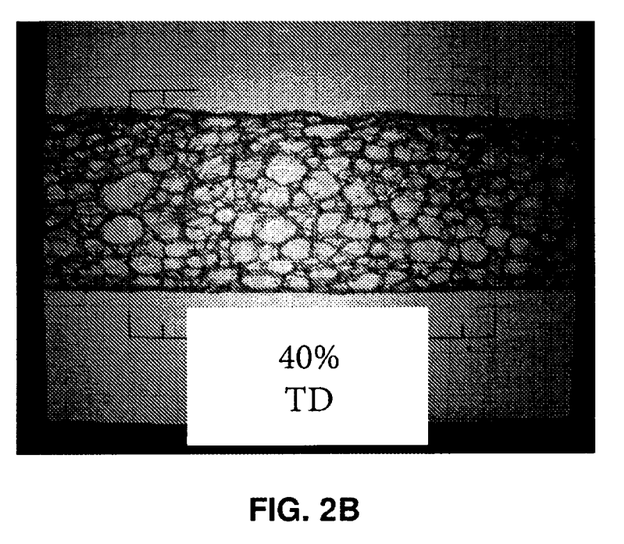
FIG. 2B is a cross sectional photo of the foam structure of Example 2 in the cross-machine direction.

After extrusion at a specific energy of 0.105 kW·hr/kg and at a temperature of 170° C. the sheet was crosslinked by electron beam radiation at a dosage of 57 kGy and then foamed continuously around 241° C. The content of azodicarbonamide and the thickness of the extruded sheet was such that a foam structure of 36 kg/m³ density, 2.0 mm thickness, and 34% crosslinking was obtained. FIG. 2A is a cross section photo of the foam structure of Example 2 in the machine direction and FIG. 2B is a cross section photo of the foam structure of Example 2 in the cross-machine direction.

Test Methods

The various properties in the above examples were measured by the following methods:

The specific energy of the extruder is calculated according to the formula:

$$\text{Specific Energy} = \frac{KW(\text{applied})}{\text{feedrate}\left(\frac{\text{kg}}{\text{hr}}\right)}, \text{ where}$$

$$KW(\text{applied}) = \frac{KW(\text{motor rating}) * (\% \text{ torque from maximum allowable}) * RPM(\text{actual running } RPM)}{\text{Max } RPM(\text{capability of extruder}) * 0.97(\text{gearbox efficiency})}$$

In general, preferred values of specific energy would be at least 0.090 k·hr/kg, preferably at least 0.105 k·hr/kg, and more preferably at least 0.120 k·hr/kg.

The "density" of foam structure is defined and measured using section or "overall" density, rather than a "core" density, according to JIS K6767. In general, preferred values of density would be 20-250 kg/m³, and more preferably 30-125 kg/m³.

"Crosslinking" is measured according to the "Toray Gel Fraction Method," where tetralin solvent is used to dissolve non-crosslinked components. In principle, non-crosslinked material is dissolved in tetralin and the crosslinking degree is expressed as the weight percentage of crosslinked material. The apparatus used to determine the percent of polymer crosslinking includes: 100 mesh (0.0045 inch wire diameter); Type 304 stainless steel bags; numbered wires and clips; a Miyamoto thermostatic oil bath apparatus; an analytical balance; a fume hood; a gas burner; a high temperature oven; an anti-static gun; and three 3.5 liter wide mouth stainless steel containers with lids. Reagents and materials used include tetralin high molecular weight solvent, acetone, and silicone oil. Specifically, an empty wire mesh bag is weighed and the weight recorded. For each sample, about 2 grams to about 10 grams±about 5 milligrams of sample is weighed out and transferred to the wire mesh bag. The weight of the wire mesh bag and the sample, typically in the form of foam cuttings, is recorded. Each bag is attached to the corresponding number wire and clips. When the solvent temperature reaches 130° C., the bundle (bag and sample) is immersed in the solvent. The samples are shaken up and down about 5 or 6 times to loosen any air bubbles and fully wet the samples. The samples are attached to an agitator and agitated for three (3) hours so that the solvent can dissolve the foam. The samples are then cooled in a fume hood. The samples are washed by shaking up and down about 7 or 8 times in a container of primary acetone. The samples are washed a second time in a second acetone wash. The washed samples are washed once more in a third container of fresh acetone as above. The samples are then hung in a fume hood to evaporate the acetone for about 1 to about 5 minutes. The samples are then dried in a drying oven for about 1 hour at 120° C. The samples are cooled for a minimum of about 15 minutes. The wire mesh bag is weighed on an analytical balance and the weight is recorded. Crosslinking is then calculated using the formula 100*(C−A)/(B−A), where A=empty wire mesh bag weight; B=wire bag weight+foam sample before immersion in tetralin; and C=wire bag weight+dissolved sample after immersion in tetralin. In general, preferred values of crosslinking degree are 20-75%, and more preferably 30-60%.

The "melt flow index" (MFI) value for a polymer is defined and measured according to ASTM D1238 at 230° C. for polypropylenes and polypropylene based materials and at 190° C. for polyethylenes and polyethylene based materials using a 2.16 kg plunger for 10 minutes. The test time may be reduced for relatively high melt flow resins.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

What is claimed as new and desired to be protected by Letters Patent of the United States is:

1. A method of forming a structure comprising:
    extruding a structure comprising 5-75 wt. % recycled metallized polyolefin material; 25-95 wt. % polypropylene, polyethylene, or combinations thereof; a crosslinking agent; and a chemical blowing agent, wherein the recycled metallized polyolefin material is small enough to pass through a standard sieve of 0.375 inches.

2. The method of claim 1, wherein the extruding is performed by a co-rotating, twin screw extruder at a specific energy of at least 0.090 kW.hr/kg.

3. The method of claim 1, wherein the recycled metallized polyolefin material has metal layer(s) with an overall thickness of 0.003-100 μm prior to recycling.

4. The method of claim 1, comprising polypropylene having a melt flow index of 0.1-25grams per 10 minutes at 230"C.

5. The method of claim 1, comprising polyethylene having a melt flow index of 0.1-25grams per 10 minutes at 190° C.

6. The method of claim 1, wherein the crosslinking agent is divinylbenzene.

7. The method of claim 1, wherein the chemical blowing agent is azodicarbonamide.

8. A method of forming a foam structure comprising:
    extruding a structure comprising 5-75 wt. % recycled metallized polyolefin material; 25-95 wt. % polypropylene, polyethylene, or combinations thereof; a crosslinking agent; and a chemical blowing agent;
    irradiating the extruded structure with ionizing radiation; and
    foaming the irradiated structure.

9. The method of claim 8, wherein the ionizing radiation is selected from the group consisting of alpha rays, beta rays, gamma rays, or electron beams.

10. The method of claim 8, wherein the extruded structure may be irradiated up to 4 separate times.

11. The method of claim 9, wherein the ionizing radiation is an electron beam with an acceleration voltage of 200-1500 kV.

12. The method of claim 11, wherein an absorbed electron beam dosage is 10-500 kGy.

13. The method of claim 8, wherein the ionizing radiation crosslinks the extruded structure to a crosslinking degree of 20-75%.

14. The method of claim 8, wherein foaming comprises heating the irradiated structure with molten salt.

15. The method of claim 8, wherein the foam structure has a density of 20-250 kg/m$^3$.

16. The method of claim 8, wherein the foam structure has an average closed cell size of 0.05-1.0 mm.

17. The method of claim 8, wherein the foam structure has a thickness of 0.2-50 mm.

* * * * *